US009253367B2

(12) United States Patent  (10) Patent No.: US 9,253,367 B2
Obara et al.  (45) Date of Patent: Feb. 2, 2016

(54) IMAGE FORMING APPARATUS

(71) Applicant: KONICA MINOLTA, INC., Chiyoda-ku, Tokyo (JP)

(72) Inventors: Mitsuru Obara, Toyohashi (JP); Tetsuya Sakai, Toyokawa (JP); Munenori Nakano, Toyokawa (JP); Hironori Akashi, Okazaki (JP); Tomoyuki Saito, Yokohama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/656,600

(22) Filed: Mar. 12, 2015

(65) Prior Publication Data

US 2015/0264221 A1  Sep. 17, 2015

(30) Foreign Application Priority Data

Mar. 13, 2014  (JP) .................................. 2014-050218

(51) Int. Cl.
*H04N 1/40*  (2006.01)
*H04N 1/00*  (2006.01)

(52) U.S. Cl.
CPC ....... *H04N 1/40068* (2013.01); *H04N 1/00031* (2013.01); *H04N 1/00068* (2013.01); *H04N 1/00997* (2013.01)

(58) Field of Classification Search
USPC ........................................................ 358/1.2
See application file for complete search history.

(56) References Cited

U.S. PATENT DOCUMENTS

| 5,024,181 | A | * | 6/1991 | Shoji | G03G 15/09 355/77 |
| 7,502,510 | B2 | * | 3/2009 | Miyoshi | G06T 9/20 382/190 |
| 7,991,265 | B2 | * | 8/2011 | Kaku | G11B 27/034 386/225 |
| 8,390,693 | B2 | * | 3/2013 | Yoneyama | G06K 9/00 348/221.1 |
| 2012/0315057 | A1 | * | 12/2012 | Nakase | G03G 15/326 399/51 |

FOREIGN PATENT DOCUMENTS

| JP | 2001265071 A | 9/2001 |
| JP | 2006276164 A | 10/2006 |
| JP | 2010050639 A | 3/2010 |

* cited by examiner

*Primary Examiner* — Allen H Nguyen
(74) *Attorney, Agent, or Firm* — Holtz, Holtz & Volek PC

(57) ABSTRACT

An image forming apparatus includes an image carrying member, a charging device that uniformly charges the image carrying member, an exposure device that forms an electrostatic latent image on the image carrying member, a development device that applies a development bias voltage to form a visible image in which toner is adhered to the electrostatic latent image, a control portion that controls an exposure amount in the exposure device and the development bias voltage and a storage portion that stores an exposure condition and a development condition. The resolution of image data can be switched to at least two types, a standard resolution and a high resolution higher than the standard resolution, and when the resolution of the image data is set at the high resolution, the control portion controls the exposure amount in the exposure device to perform thinning processing on the image.

10 Claims, 7 Drawing Sheets

FIG. 11
| THREE CONDITIONS FOR PRODUCING LADDER PATTERN | LDa (= EXPOSURE AMOUNT OF 600 dpi) |
| --- | --- |
| | LDb (= ( LDa + LDc ) / 2) |
| | LDc (= LOWEST EXPOSURE AMOUNT OF 1200 dpi) |
FIG. 12
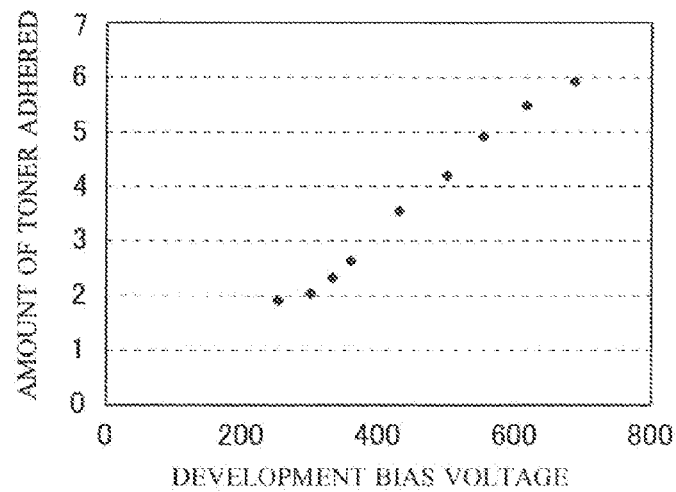
FIG. 13
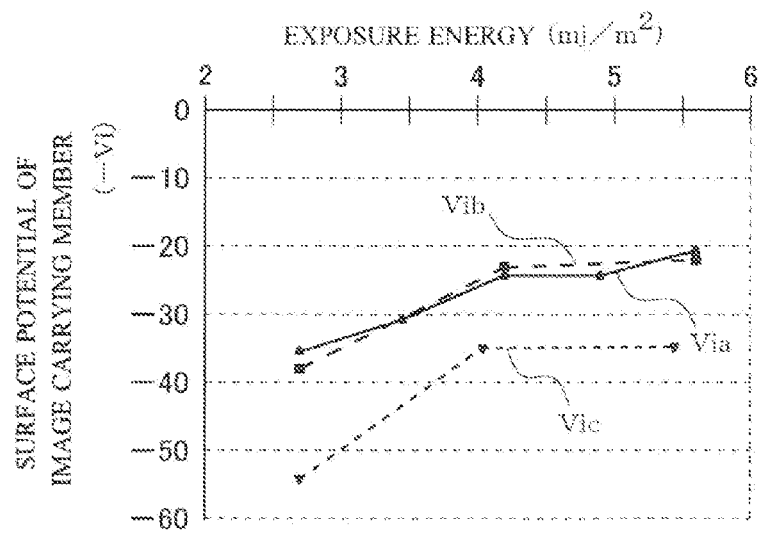

IMAGE FORMING APPARATUS

This application is based on Japanese Patent Application No. 2014-050218 filed on Mar. 13, 2014 the contents of which are hereby incorporated by reference.

BACKGROUND OF THE INVENTION

1. Field of the Invention

The present invention relates to an image forming apparatus that uses an electrophotographic process such as in a copying machine, a printer or a facsimile, and more particularly relates to an image forming apparatus that can produce an output with a plurality of resolutions.

2. Description of the Related Art

For output devices using an electrophotographic process, it is increasingly required to enhance the image quality and the speed, and simultaneously, it is also required that a user can arbitrarily select the resolution according to the purpose, and for these applications, an image forming apparatus having a plurality of resolutions is used.

An electrophotographic process is performed as follows: light corresponding to image information such as an original document or electronic data is applied to the surface of an image carrying member charged by a charging device to form an electrostatic latent image, toner is adhered to the electrostatic latent image to form a visible toner image and the toner image is transferred to a sheet such as paper or photographic paper and is fixed to the sheet to obtain a predetermined image. Here, as a method of switching resolutions, there are known a method of switching the speed of a light change unit that writes the electrostatic latent image and a method of switching the speed of the image carrying member that receives light.

In the method of switching the speed of the light change unit such as a polygon minor, even when the resolution is switched, the speed of the image formation does not change, and even when a low resolution is selected, the print speed is the same as when a high resolution is selected. On the other hand, in the method of switching the speed of the image carrying member, when a low resolution is selected, it is possible to increase the print speed as compared with the case where a high resolution is selected, with the result that it is possible to meet a high-speed print application.

However, in terms of image quality, in the method of switching the speed of the image carrying member, since when a high resolution is selected, the speed of the image carrying member is lowered as compared with the case where a low resolution is selected, the time for development is increased. Consequently, there is a tendency that the density of an image is increased to increase its line width. Hence, when the resolution is switched, even for the same image, different images are disadvantageously output.

For this problem, a method of performing digital processing on image data to decrease the line width is known. A method of optimizing the conditions of image formation in the electrophotographic process to cope with the problem is also known. The amount of toner adhered is related to the characteristics of the image carrying member, the intensity of light in an exposure device, a potential difference between the bias voltage of a development device and the surface of the image carrying member and the like. Hence, for the problem described above, Japanese Unexamined Patent Application Publication No. 2001-265071 discloses that the image formation conditions are examined and that design conditions at the time of switching are indicated. Specifically, according to the sensitivity constant of the image carrying member, a relationship between the desired output of the exposure device and the bias voltage of the development device is indicated.

As a method of controlling the density and the line width of an image, there is a method of using a density sensor and a potential sensor, and a method of using the detection values thereof to control the exposure device and the development device is known. For example, Japanese Unexamined Patent Application Publication No. 2010-50639 discloses that a line drawing is formed, the width and the density thereof are measured and a development bias is adjusted and that a patch image is formed, the density thereof is measured and the exposure amount is controlled. Furthermore, Japanese Unexamined Patent Application Publication No. 2006-276164 proposes an another method because a sensor detects part of an image but it is difficult to detect the entire image formation region. In other words, data on the surface potential of the image carrying member, data on the image and data on the exposure level are used to simulate the profile of the electrostatic latent image, and the quality of the image produced according to the simulated electrostatic latent image is evaluated, with the result that the exposure device and the development device are controlled. Specifically, while the surface potential of the image carrying member by the charging device and the exposure amount by the exposure device, the bias voltage of the development device and the like are being changed, the simulation is repeated, and conditions under which the desired image quality can be obtained are found, with the result that the image formation is performed under such conditions.

In the electrophotographic process, edge processing is normally performed in order to enhance character reproducibility, specifically, the line width of characters. When toner is adhered to the electrostatic latent image on the surface of the image carrying member, the amount of toner adhered by the potential difference (which may hereinafter be referred to as a development gap) between the surface potential and the bias voltage of the development device. Here, in an edge portion of the image, an electrical field enters from its periphery, thus the toner is more likely to be adhered and the toner is adhered to the outside of the periphery of the range of the electrostatic latent image in the edge portion. Consequently, the line width of the character in the toner image is increased as compared with the character width of the electrostatic latent image.

For example, when an output is produced at a resolution of 1200 dpi, the character area of an output image is about 1.3 times as large as that of an image that undergoes the edge processing and that has a resolution of 600 dpi. This is a level at which it can be identified visually, and thus the output result disadvantageously differs depending on the resolution. Hence, the edge processing for thinning the edge portion is performed. For example, for an image where a white character is drawn within a black solid, the edge processing is performed to prevent the white character from collapsing.

The edge processing described above is intended to thin the edge portion of a character/line image, and is performed only for a character/line image. As images, there are a character/line image that is determined by two values and a figure/photo image that is formed with multiple values having a plurality of intermediate values. Since when the edge processing is performed on the figure/photo image, intermediate gradation densities are affected to degrade the image quality, the edge processing is not performed on the figure/photo image. Hence, in order to determine to which one of the images the input image data belongs, the image forming apparatus incorporates a region determination function.

The region determination function incorporates a plurality of line memories for properly determining the region. As the number of line memories is increased, the region to be determined is expanded, with the result that it is possible to enhance the determination accuracy and the determination processing speed. On the other hand, as the resolution of an image to be processed is increased, the amount of information per unit area of the image is increased. For example, an image of 1200 dpi has four times as much information as an image of 600 dpi based on simple calculation. Hence, when a high resolution is used, the amount of data to be processed is increased, and thus it takes more time to perform region determination processing than a case where a low resolution is used. In order to solve this problem, it is necessary to incorporate a larger number of line memories.

However, in terms of cost constraints, it may be difficult to incorporate the necessary number of line memories. In such a case, instead of the edge processing, a method of thinning processing is required. In the technologies proposed in Japanese Unexamined Patent Application Publication No. 2001-265071 and Japanese Unexamined Patent Application Publication No. 2010-50639 described above, there are problems to be solved in the thinning processing in terms of general versatility and accuracy to which setting conditions can be applied. The technology proposed in Japanese Unexamined Patent Application Publication No. 2006-276164 is not sufficient in terms of cost and standby time.

An object of the present invention is to provide an image forming apparatus that can achieve, without increasing the number of line memories, character reproducibility at a high resolution in the same manner as character reproducibility at a low resolution.

SUMMARY OF THE INVENTION

According to the present invention, there is provided an image forming apparatus including: an image carrying member; a charging device that uniformly charges a surface of the image carrying member; an exposure device that applies light to the charged image carrying member to form an electrostatic latent image; a development device that applies a development bias voltage to a developer carrying member which carries a developer including at least a toner and that moves the toner from the developer carrying member to the electrostatic latent image to form a visible image; a control portion that controls an exposure amount in the exposure device and the development bias voltage; and a storage portion that stores an exposure condition and a development condition, where a resolution of image data can be switched to at least two types, a standard resolution and a high resolution higher than the standard resolution, and when the resolution of the image data is set at the high resolution, the control portion controls the exposure amount in the exposure device to perform thinning processing on the image.

Preferably, in the image forming apparatus according to the present invention, in addition to the configuration described above, the storage portion previously stores an adjustment exposure amount that needs to be lowered from the exposure amount at the standard resolution when the resolution is set at the high resolution to obtain a predetermined thickness of a thin line, and when the resolution of the image data is set at the high resolution, the control portion lowers the exposure amount in the exposure device only by the adjustment exposure amount as compared with the exposure amount at the standard resolution, and thus the thinning processing is performed.

Preferably, in the image forming apparatus according to the present invention, in addition to the configuration described above, the storage portion previously stores an adjustment exposure amount which needs to be lowered from the exposure amount at the standard resolution when the resolution is set at the high resolution to obtain a predetermined thickness of a thin line and a lowest exposure amount at which the surface potential of the image carrying member can be minimized, and when the adjustment exposure amount is higher than a difference between the exposure amount at the standard resolution and the lowest exposure amount, the control portion sets the exposure amount in the exposure device at the lowest exposure amount when the resolution of the image data is set at the high resolution, and thus the thinning processing is performed.

Furthermore, preferably, in the image forming apparatus according to the present invention, in addition to the configuration described above, the storage portion previously stores an adjustment exposure amount which needs to be lowered from the exposure amount at the standard resolution when the resolution is set at the high resolution to obtain a predetermined thickness of a thin line and a lowest exposure amount at which the surface potential of the image carrying member can be minimized, the control portion includes a test pattern formation unit that forms a predetermined image under a predetermined image formation condition, an image detection unit that optically detects the image formed by the test pattern formation unit and an image analysis unit that analyzes a result of the detection of the detection unit and when the adjustment exposure amount is lower than a difference between the exposure amount at the standard resolution and the lowest exposure amount, the control portion forms, when the resolution of the image data is set at the high resolution, a plurality of images by changing the exposure amount with the test pattern formation unit, analyzes line widths of the images with image analysis unit to calculate an exposure amount at which the predetermined thickness of the thin line can be obtained and sets the exposure amount at the high resolution at the calculated exposure amount, and thus the thinning processing is performed.

Preferably, in the image forming apparatus according to the present invention, the control portion performs, in addition to the thinning processing on the image with the exposure amount in the exposure device, the thinning processing on the image by controlling the development bias voltage.

Preferably, in the image forming apparatus according to the present invention, the storage portion previously stores an adjustment exposure amount which needs to be lowered from the exposure amount at the standard resolution when the resolution is set at the high resolution to obtain a predetermined thickness of a thin line and a lowest exposure amount at which the surface potential of the image carrying member can be minimized, the control portion includes a test pattern formation unit that forms a predetermined image under a predetermined image formation condition, an image detection unit that optically detects the image formed by the test pattern formation unit and an image analysis unit that analyzes a result of the detection of the detection unit and when the adjustment exposure amount is higher than a difference between the exposure amount at the standard resolution and the lowest exposure amount, the control portion forms, when the resolution of the image data is set at the high resolution, a plurality of images by changing the development bias voltage with the test pattern formation unit, analyzes densities of the images with the image analysis unit to calculate a development bias voltage at which a predetermined image density can be obtained, forms a plurality of images by changing the exposure amount with the test pattern formation unit under a condition of the calculated bias voltage, calculates, from the images, with the image analysis unit, an exposure amount at which the predetermined thickness of the thin line can be obtained, sets the development bias voltage at the high resolution at the calculated bias voltage and sets the exposure amount at the calculated exposure amount, and thus the thinning processing is performed.

Preferably, in the image forming apparatus according to the present invention, the storage portion previously stores at least one of a relationship between a use environment and a lowest exposure amount and a relationship between the use environment and an adjustment exposure amount, the control portion includes an environment detection unit that detects an environmental condition used and when the resolution of the image data is set at the high resolution, the control portion sets at least one of the lowest exposure amount and the adjustment exposure amount at an exposure amount corresponding to a result of the detection of the environment detection unit, and thus the thinning processing is performed.

BRIEF DESCRIPTION OF THE DRAWINGS

FIG. 11 An illustration diagram showing an example of exposure conditions when a test pattern is formed in the present invention;

FIG. 12 A characteristic diagram showing an example of a relationship between a development bias voltage and the amount of toner adhered; and FIG. 13 A characteristic diagram illustrating an example of the effect on the light attenuation curve of the image carrying member by environmental conditions.

DESCRIPTION OF PREFERRED EMBODIMENTS

Although the present invention will be described in more detail below using an embodiment, the present invention is not limited at all to the embodiment.

Figure 2:
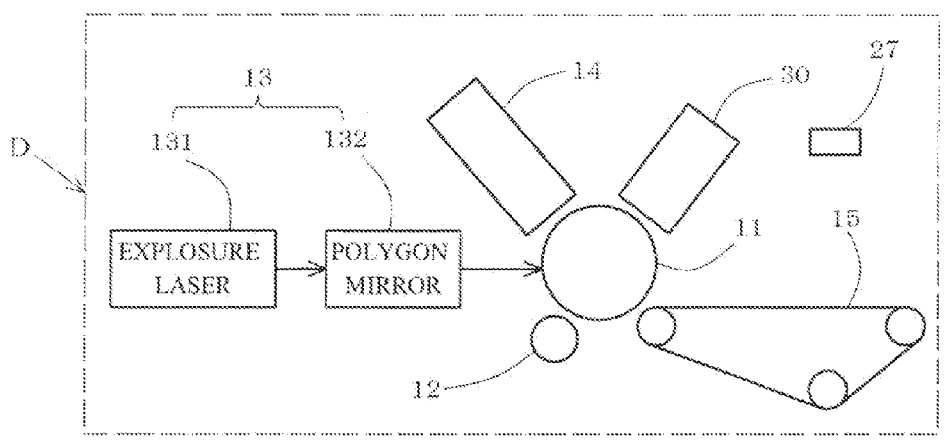
FIG. 2 A configuration diagram showing an example of an image formation function portion of an image forming apparatus to which the present invention is applied.

FIG. 2 shows an example of an image formation function portion of an image forming apparatus D according to the present invention. A photoconductive drum (image carrying member) 11 is rotated clockwise in the figure, and around the circumference of the photoconductive drum 11, a charging device 12, an exposure device 13 and a development device 14 are provided. The charging device 12 uniformly charges the circumferential surface of the photoconductive drum 11. In the exposure device 13, an exposure laser 131 emits laser light according to a pulse-width modulated input, scanning is performed in a main scanning direction by a polygon mirror 132 and an electrostatic latent image is formed on the surface of the photoconductive drum 11. Then, in the development device 14, toner is moved to the photoconductive drum 11 by a potential difference between a bias voltage applied by the development device 14 and the surface of the photoconductive drum 11, and a toner image is formed.

Thereafter, the toner image is transferred to an intermediate transfer belt 15, is further transferred again to an unillustrated sheet, is then heated and pressurized in a fixing device and is fixed to the sheet. Although FIG. 2 shows the configuration of an apparatus for a mono-color image, the configuration of an apparatus for a full-color image where a plurality of development devices 14 are arranged may naturally be adopted.

In FIG. 2, an image detection device 30 detects, with an optical unit, the toner image developed in the development device 14, and measures the amount of toner adhered. The specific configuration and function will be described later. The image detection device 30 may be configured so as to detect not only the amount of toner adhered to the surface of the photoconductive drum 11 but also the amount of toner adhered to the surface of the intermediate transfer belt 15 or to the surface of the transferred sheet.

Figures 3, 4:
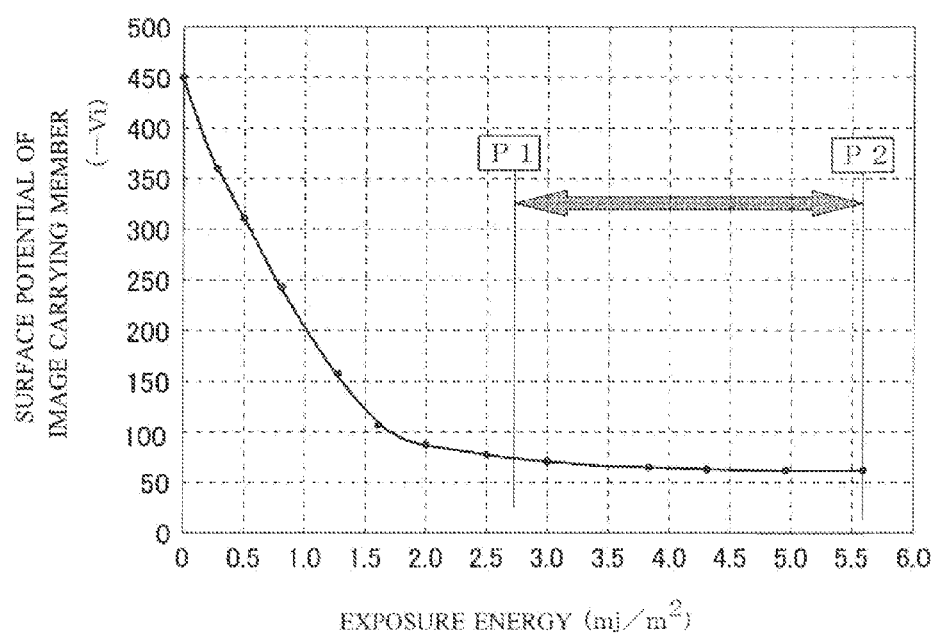
FIG. 3 A character string diagram showing an example of whether or not edge processing is performed and the difference in character reproducibility between resolutions.
FIG. 4 A diagram of a light attenuation curve showing an example of a relationship between the exposure energy and the surface potential of an image carrying member.

The rotation speed of the photoconductive drum 11 is switched between a plurality of rotation speeds such that an output can be produced with a plurality of resolutions, and as the resolution is higher, the photoconductive drum 11 is rotated more slowly. Consequently, although a high-definition image having a large number of pixels is formed as compared with a case where the resolution is low, there is a tendency that the character, the line and the like are thickened and the density is increased. An example thereof is shown in FIG. 3. As understood from FIG. 3, as compared with characters with a resolution of 600 dpi on which edge processing is performed and which are shown on the left side, characters with a resolution of 1200 dpi on which edge processing is not performed and which are shown on the right side appear thick.

Hence, in the present invention, the exposure amount is first adjusted to enhance the character reproducibility at a high resolution. FIG. 4 shows the PIDC characteristic of the photoconductive drum 11. This figure shows how the surface potential is changed depending on the intensity of light energy when light energy is applied to the uniformly charged photoconductive drum 11. Although as the intensity of light energy is increased, the surface potential is lowered, when exposure energy is equal to or more than P1, the surface potential of the photoconductive drum 11 is reduced to the lowest level, and a substantially constant region is formed. In FIG. 4, the direction in which the negative potential is increased is represented as the direction in which the potential is increased.

As described above, when the exposure energy is equal to or more than the specific value P1, since the potential of the exposure part is not significantly lowered beyond the value, even if the exposure energy is changed within the range of the specific value P1 or more, the potential difference (development gap) between the surface potential of the photoconductive drum 11 and the bias voltage of the development device 14 is little changed, with the result that the toner concentration is not significantly affected.

Figure 1:
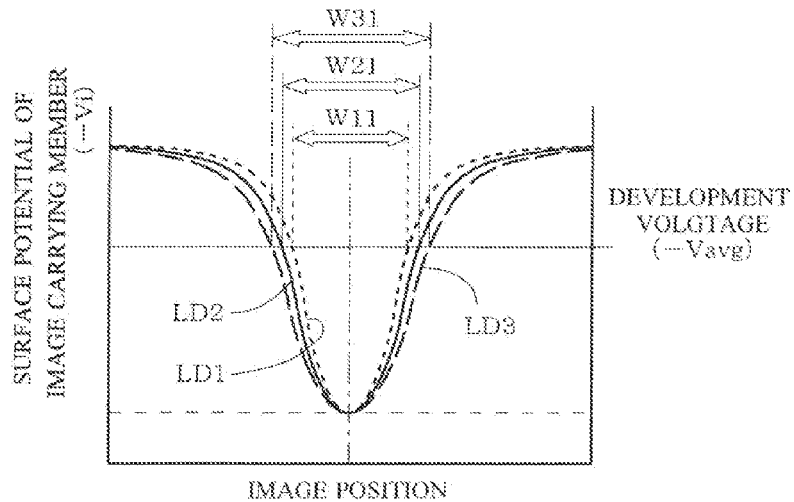
FIG. 1 An illustration diagram showing an example of thinning processing in the present invention.

FIG. 1 shows, when three exposure energies are applied within a range from P1 to P2 in the PIDC characteristic of FIG. 4, the exposed local surface potential distribution of the photoconductive drum 11. In the surface potential distribution, an exposure point is assumed to be an image position, the left and right thereof are connected as gentle curves to the potential of portions which are not exposed, and the surface potential distribution is formed in the shape of the letter V. In the potential distribution when the exposure energy is changed in three stages from LD3 where the exposure energy is high to LD1 where the exposure energy is low, the potential of the position that is the center of the exposure does not change because it is within the saturated range from P1 to P2 in FIG. 4 but the width of the valley W11 to W31 is increased as the exposure energy is increased.

When the development bias voltage is appropriately set, with the assumption that the exposed image position is in the center, the width of the toner image formed on the photoconductive drum 11 to which the toner is drawn is the width W31 in a case where the exposure intensity is LD3, is the width W21 in a case where the exposure intensity is LD2 or is the width W11 in a case where the exposure intensity is LD1. In other words, the width of the adhered toner is increased as the intensity of the exposure is increased whereas the width is decreased as the intensity of the exposure is decreased. Since the potential of the image center position remains the same, the toner concentration does not change.

However, in the PIDC characteristic of FIG. 4, when the exposure amount is lowered to a region where the exposure energy is equal to or less than P1, the potential in the exposure position is changed. The potential of the exposure position at the bottom of the valley in the shape of the letter V in FIG. 1 is increased, and thus the development gap is reduced. Consequently, since the amount of toner adhered in the image center position is decreased, the concentration is lowered, and thus variations in concentration may be produced.

Figure 5:
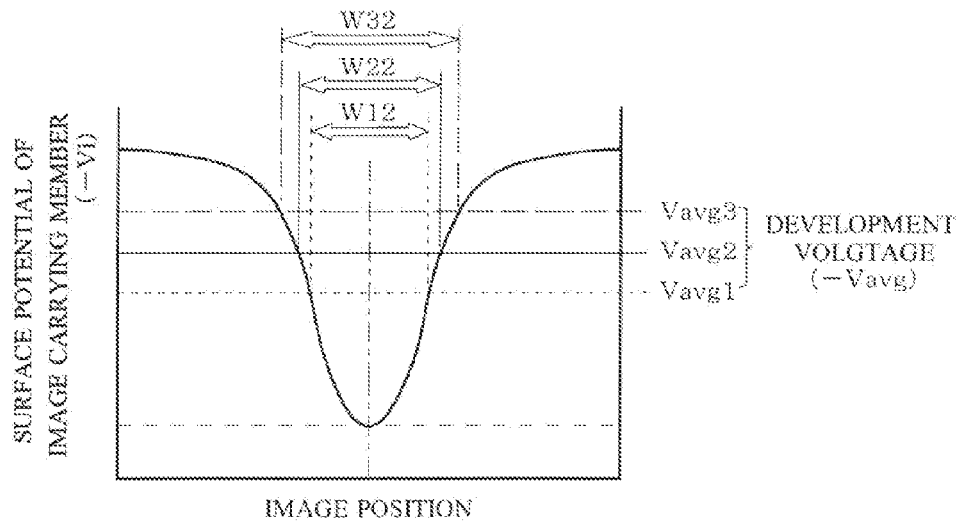
FIG. 5 An illustration diagram showing another example of the thinning processing in the present invention.

Then, FIG. 5 shows, when the development bias voltage is changed, the local potential distribution of the surface potential of the photoconductive drum 11. In a case where the exposure conditions are the same, though the surface potential distribution is a curve similar to that in FIG. 1, when the development bias voltage is changed, the width of the potential that draws the toner is changed. When the development bias voltage is Vavg3, the width is a width W32, when the development bias voltage is Vavg2, the width is a width W22 and when the development bias voltage is Vavg1, the width is a width W12. In other words, when the development bias voltage is increased, the width of the adhered toner is increased whereas when the development bias voltage is lowered, the width is decreased.

However, here, the development gap is changed simultaneity. In other words, the difference between the development bias voltage Vavg and the surface potential Vi in the image position in FIG. 5 is also changed. Hence, the amount of toner adhered to the image center position is also changed. When the development bias voltage is lowered so as to decrease the line width, the development gap is also decreased, the amount of toner adhered is reduced and the concentration is lowered, with the result that variations in concentration may be produced.

In the present invention, attention is focused on the characteristics described above, and when it is impossible to enhance the character reproducibility at a high resolution only by adjusting the exposure amount, the development bias voltage is further adjusted to enhance the character reproducibility.

Figure 6:
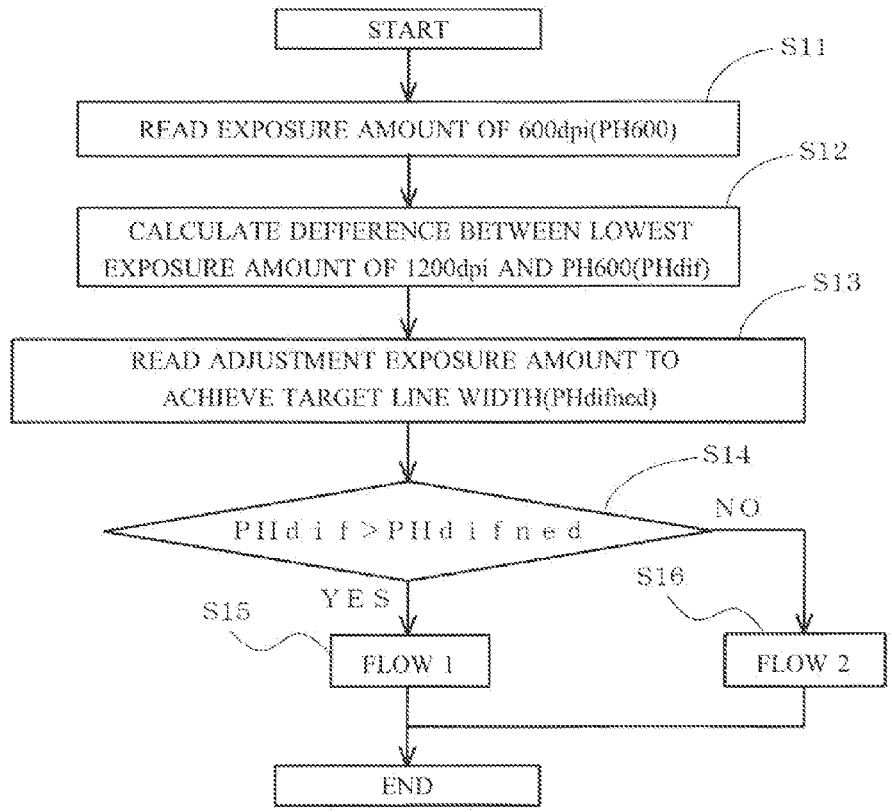
FIG. 6 A control flowchart showing an example of preprocessing for performing thinning processing in the present invention.

FIG. 6 shows the control flow of an example of preprocessing for performing thinning processing in the present invention. Here, a description will be given with the assumption that 600 dpi is a standard resolution and 1200 dpi is a high resolution. This control is performed when a user sets the resolution at the high resolution, and first, in step S11, data on an exposure amount PH600 at the standard resolution is read. This is not constant because in order to maintain the image quality, the exposure amount and the development bias voltage are automatically optimized as image stabilization control. Hence, the immediately previous exposure amount data is read.

Then, in step S12, a difference PHdif between the exposure energy (hereinafter referred to as the lowest exposure amount) at point P1 in the PIDC characteristic of 1200 dpi and PH600 read in step S11 is calculated. The lowest exposure amount is previously stored as the characteristic of the photoconductive drum 11. Then, in step S13, data on an exposure amount PHdifned (hereinafter referred to as an adjustment exposure amount) which needs to be lowered than that at the standard resolution is read so that a line thickness without edge processing with the high resolution is made equal to a line thickness when edge processing is performed. This value is also previously determined from the relationship between the resolution, the exposure amount and line width and is stored.

Then, in step S14, which one of the exposure amount difference PHdif and the exposure amount PHdifned is higher is determined. When the exposure amount difference PHdif is higher than the exposure amount PHdifned, the process proceeds to step S15, and an unillustrated flow 1 of the thinning processing is performed. On the other hand, when the exposure amount difference PHdif is lower than the exposure amount PHdifned, the process proceeds to step S16, and an unillustrated flow 2 of the thinning processing is performed. Specifically, what is determined in step S14 is whether the exposure amount falls below the lowest exposure amount when the high resolution is set and the exposure amount is lowered only by the adjustment exposure amount from the exposure amount at the standard resolution.

In the flow 1 of step S15, in a case where the high resolution is set, even if the exposure amount is lowered only by the adjustment exposure amount from the exposure amount at the standard resolution, when the exposure amount is higher than the lowest exposure amount, the thinning processing is performed by changing only the exposure amount.

On the other hand, in the flow 2 of step S16, in a case where the high resolution is set, if the exposure amount is lowered only by the adjustment exposure amount from the exposure amount at the standard resolution, when the exposure amount is lower than the lowest exposure amount, the thinning processing is performed by adjusting both the exposure amount and the development bias voltage. However, the following easy control method can be considered: if the exposure amount is lowered only by the adjustment exposure amount from the exposure amount at the standard resolution, when the exposure amount is slightly lower than the lowest exposure amount, since the development gap is still slightly changed, without the development bias voltage being changed, the exposure amount is set at the lowest exposure amount stored, and image formation is performed.

A description will then be given of a configuration in which the exposure amount and the development bias voltage are controlled while the density and the line width of the toner image are being optically detected, and thus the thinning processing is performed.

Figure 7:
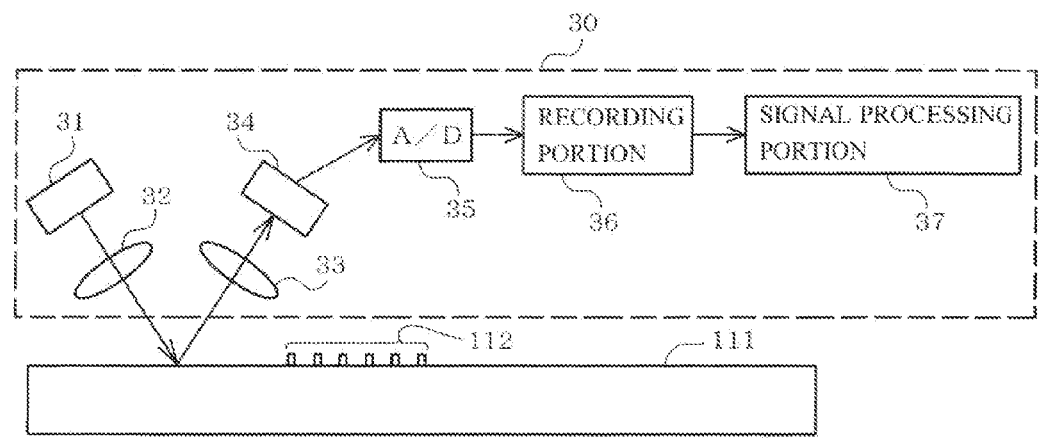
FIG. 7 A configuration diagram showing an example of an image detection unit in the present invention.

In an image detection unit 30 shown in FIG. 7, measurement light emitted from a light source 31 is collected by a light collection lens 32 and is applied to a target image. The light reflected off the target image is formed into an image on a light reception sensor 34 by a light reception lens 33. The image detection unit 30 is designed for adjusting the density of an image and is commonly referred to as an IDC sensor. Although in general, an LED is used as the light source, and a photodiode is used as the light reception sensor, as long as components have the same functions, there are no restriction on them. Here, the target image is formed on a support member 111 such as the photoconductive drum 11, the intermediate transfer belt 15 or an unillustrated sheet.

In the measurement of the amount of toner adhered, a toner patch 112 that is a constant pattern is formed as the target image. The measurement light is first applied to the surface of the support member 111 on which the toner patch 112 is not formed, and the amount of measurement light is adjusted such that the reflected light is equal to a set value. This operation is performed such that measurement values are not affected by the state of the surface of the support member 111 and individual differences in the measurement portions. Then, the measurement light is applied to the toner patch 112, and the amount of reflected light is measured.

A voltage output from the light reception sensor 34 that receives the reflected light is converted by an A/D converter 35 into a digital signal, and is stored in a recording portion 36. In a signal processing portion 37, the amount of toner adhered on the target image is calculated from reflection waveform data stored in the recording portion 36.

Figure 8:
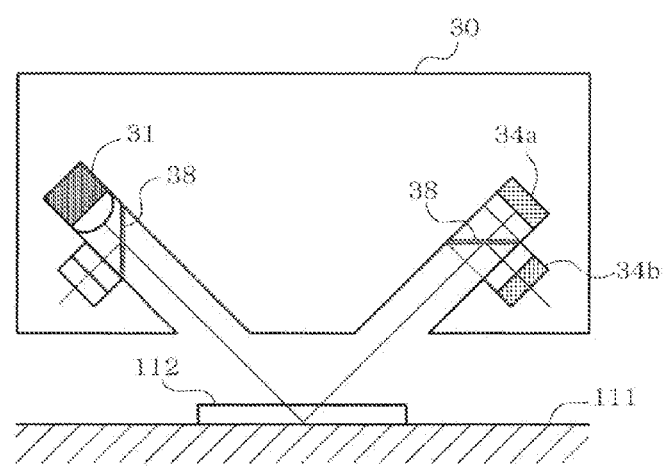
FIG. 8 A configuration diagram showing an example of an optical portion forming part of the image detection unit in the present invention.

As the wavelength of the measurement light, a wavelength at which the light is not reflected off the toner patch 112 but is reflected off the surface of the support member 111 is preferably used because the difference therebetween clearly appears. The light is not reflected off K color (black) but is reflected off C (cyan), M (magenta) and Y (yellow). Hence, in color, an IDC sensor as shown in FIG. 8 is used. The IDC sensor shown in FIG. 8 includes the light source 31, a light reception sensor 34a, a light reception sensor 34b and polarization plates 38 arranged on the front surfaces of the light reception sensors 34a and 34b. The light reflected off the support member 111 is regularly reflected without being deflected, and thus is detected by the light reception sensor 34a. The light reflected off the toner patch 112 is regularly reflected and diffusely reflected in a mixed manner, and thus the light that is regularly reflected without being deflected is detected by the light reception sensor 34a, and the diffusely reflected light that is deflected is detected by the light reception sensor 34b. The amount of toner adhered to the toner patch 112 is calculated by subtracting the amount of light in the light reception sensor 34b from the amount of light in the light reception sensor 34a.

Figure 9:
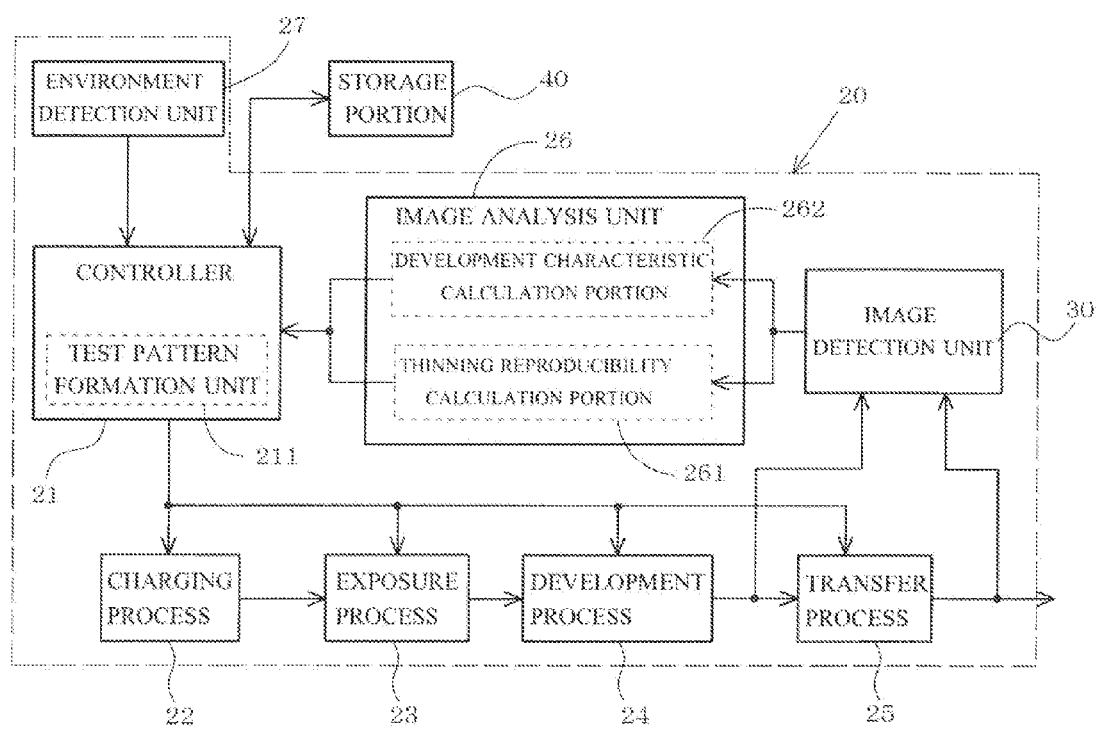
FIG. 9 A configuration diagram showing an example of a control portion for performing thinning processing in the present invention.

FIG. 9 shows an example of the configuration of a control portion 20 that performs the thinning processing when the image detection unit 30 described above is included. The result of the detection of the image detection unit 30 is fed to an image analysis unit 26 that includes a thinning reproducibility calculation portion 261 and a development characteristic calculation portion 262. The result of the analysis of the image analysis unit 26 is fed to a controller 21. The controller 21 controls a charging process 22, an exposure process 23, a development process 24 and a transfer process 25 from the result of the analysis, storage data stored in a storage portion 40 and the result of the detection of an environment detection unit 27 according to predetermined programs.

In the thinning reproducibility calculation portion 261, a relationship between the exposure amount and the toner line width is determined from the data of the image detection unit 30 as a thinning reproducibility characteristic. In the controller 21, the exposure amount is determined such that the line width at the standard resolution stored in the storage portion 40 is achieved. The details thereof will be described later.

In the development characteristic calculation portion 262, a relationship between the development bias voltage and the amount of toner adhered is determined from the data of the image detection unit 30 as the development characteristic. In the controller 21, the limit of the amount of toner adhered which is stored in the storage portion 40 and in which variations in concentration are not produced and the detected development characteristic are compared, and thus the development bias voltage is determined. The details thereof will be described later.

The lowest exposure amount, the adjustment exposure amount, the development bias voltage and the exposure amount on which the image stabilization control is performed at the standard resolution and which are updated, as have been described so far, and various types of data which are used as comparison criteria for the thinning processing are stored in the storage portion 40. Among them, a relationship between environmental conditions such as the temperature and humidity, a cumulative operation time and the proper values of the lowest exposure amount and the adjustment exposure amount is also included.

In the controller 21, a test pattern formation unit 211 that forms a measurement toner patch is incorporated. The environment detection unit 27 measures operation environments for the photoconductive drum 11, which is an image formation function portion, the exposure device 13 and the development device 14, constantly detects the temperature and humidity and feeds data on them to the controller 21.

Figure 10:
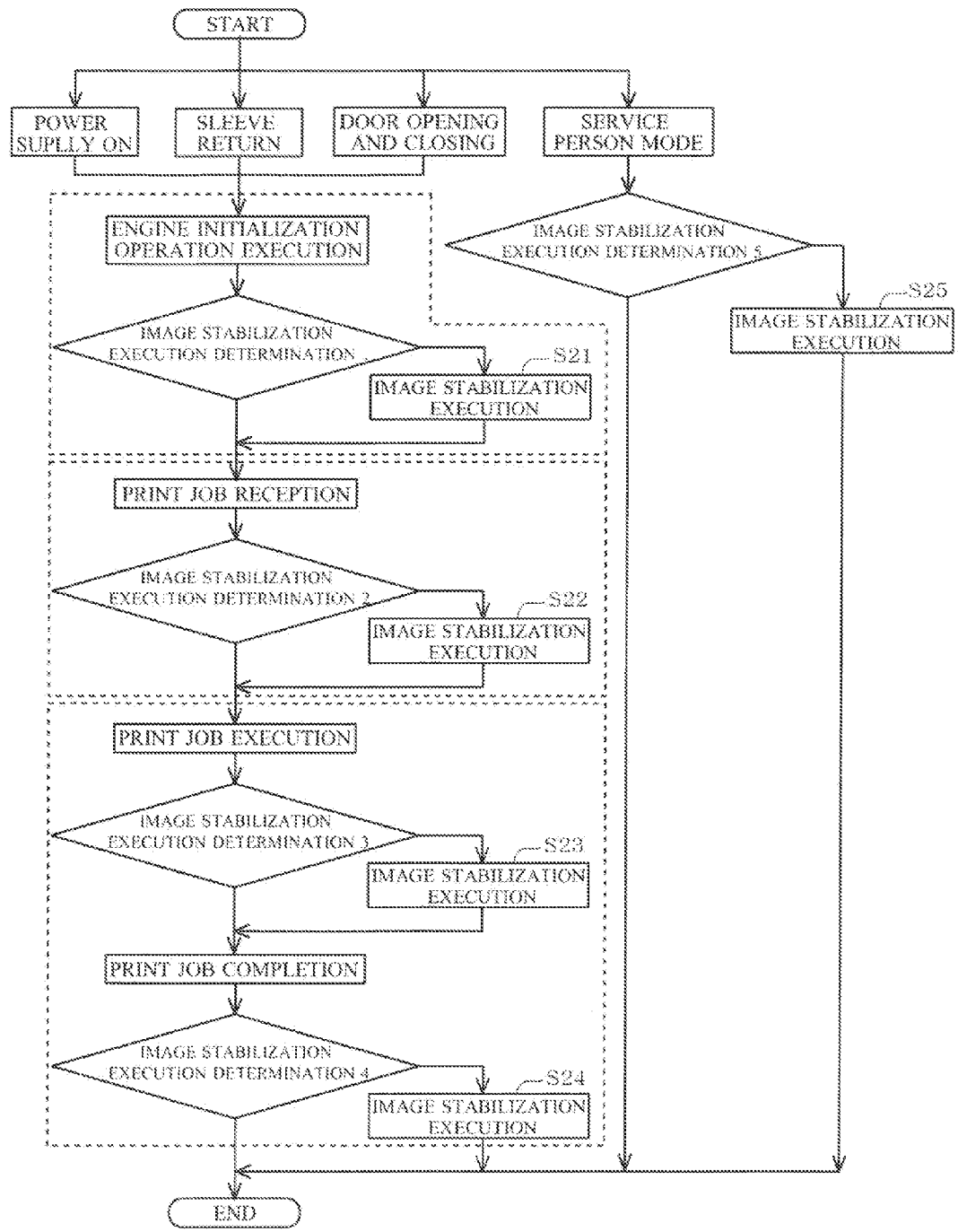
FIG. 10 A flowchart showing an example of the timing at which image stabilization control is performed in the image forming apparatus.

Here, the exposure amount PH600 read in step S11 of FIG. 6 will be described. When the image formation is performed at the standard resolution, in order for the image quality to be maintained, the exposure amount and the development bias voltage are controlled to be the proper values at a plurality of timings (image stabilization execution). FIG. 10 shows its execution timing example. The image stabilization is performed when the engine initialization of the image is completed (step S21), when a print job is received (step S22), when the print job is being performed (step S23), when the print job is completed (step S24) and when an instruction is specially provided by a service person (step S25). At these timings, the exposure amount and the development bias voltage are adjusted and set. Then, the setting values for them are read in step S11 of FIG. 6.

In this image stabilization, the toner patch image described above is detected with the image detection unit 30 and is analyzed with the image analysis unit 26, and thus proper conditions at the standard resolution are found. The following method may alternatively be adopted: data on the exposure amount and the development bias voltage suitable for the environmental conditions and a cumulative use time is previously stored in the storage portion 40, and at the execution timing described above, the exposure amount and the development bias voltage corresponding to the environment and the cumulative use time at that time are selected.

A method of optically detecting the toner image and controlling it in the flow 1 of step S15 in FIG. 6 will be described. The toner patch is first formed with the test pattern formation unit 211 of the controller 21. Here, the toner patch is formed with three exposure amounts shown in FIG. 11. Specifically, the exposure amount LDa that is the same as the standard exposure amount, the lowest exposure amount LDc, an intermediate value between LDa and LDc and the toner patch are formed. As the toner pattern formed here, for example, a pattern called a ladder pattern is used in which a line and a blank are alternately arranged and in which the ratio of the line to the blank is 1 to 3. Here, the development bias voltage is the same voltage as that at the standard resolution.

The toner patterns are formed with the three exposure amounts described above, and the line width thereof is detected with the image detection unit 30 and is calculated with the thinning reproducibility calculation portion 261, with the result that a characteristic diagram indicating a relationship between the exposure amount and the line width can be obtained. The exposure amount with which the same line width as that at the standard resolution is obtained is calculated therefrom. The controller 21 determines that the calculated exposure amount and the development bias voltage at the standard resolution are the exposure amount and the development bias voltage at the high resolution, and outputs them to the exposure process 23 and the development process.

A method of optically detecting the toner image and controlling it in the flow 2 of step S16 in FIG. 6 will then be described. Here, in addition to the exposure amount, the development bias voltage is also the control target. Two-stage control is performed in which the development bias voltage is first determined and thereafter the exposure amount is determined First, a plurality of different development bias voltages are used to form a toner patch of a solid image (black 100%) with the test pattern formation unit 211. The density of the toner patch is detected with the image detection unit 30, and in the development characteristic calculation portion 262, as shown in FIG. 12, a development characteristic diagram indicating the relationship between the development bias voltage and the toner concentration is obtained.

The controller 21 calculates the development bias voltage from the development characteristic diagram obtained and conditions under which the amount of toner adhered is minimized in a range where variations in concentration stored in the storage portion 40 can be allowed. Thereafter, under the calculated conditions of the development bias voltage, a pattern is formed under three exposure conditions, a new exposure amount is calculated from the relationship between the line width and the exposure amount and the step described in the flow 1 is performed. The calculated development bias voltage and the calculated exposure amount that are newly obtained as described above are determined to be the development bias and the exposure amount when the image formation is performed at the high resolution. The reason why when the development bias voltage in the preceding stage is calculated, the calculation criterion is set such that the amount of toner adhered is minimized in the range where variations in concentration can be allowed is that when the exposure amount in the subsequent stage is determined, the controllable range for determining the line width is maximized.

Incidentally, it is known that the photosensitive characteristics of the photoconductive drum 11 are changed depending on the environment such as temperature and humidity. Furthermore, it is also known that a change in the film thickness of the photosensitive layer varies the characteristics. These characteristic changes appear as changes in the PIDC characteristic shown in FIG. 4. Hence, the point P1 on which attention is focused in the present invention, that is, the lowest exposure amount is also changed. The adjustment exposure amount is also changed that is an exposure amount which should be lowered at the high resolution in order to achieve the same line width as that at the standard resolution.

For example, as in the PIDC characteristic shown in FIG. 13, the relationship between the exposure amount and the surface potential of the photoconductive drum 11 is changed depending on the temperature and humidity. In FIG. 13, the positive and negative of the vertical axis are opposite to FIG. 4, and only the vicinity of the turn of curves is shown. Via represents the curve under an environment of constant temperature and humidity, Vib represents the curve under an environment of high temperature and humidity and Vic represents the curve under an environment of low temperature and humidity. Depending on such environmental changes, the value of the exposure amount that is a saturation region where the surface potential does not change is changed, and the level of the surface potential at the time of saturation itself is also changed.

Hence, preferably, when the exposure amount and the development bias voltage are determined to perform the thinning processing, the environmental conditions and the relationship between the lowest exposure amount and the adjustment exposure amount are stored as a table in the storage portion 40. Then, when the image formation is performed at the high resolution, the lowest exposure amount and the adjustment exposure amount are selected from the temperature and humidity detected by the environment detection unit 27, and thus it is possible to perform more accurate thinning processing. Only any one of the lowest exposure amount and the adjustment exposure amount may naturally be selected according to sensitivity humidity.

Since it is difficult to directly measure the film thickness of the photosensitive layer of the photoconductive drum 11, the cumulative operation time may be used as an alternate characteristic for the change in the film thickness. For example, data on how the lowest exposure amount and the adjustment exposure amount are changed depending on the cumulative operation time or the cumulative number of revolutions is previously stored in the storage portion 40, and the lowest exposure amount and the adjustment exposure amount used when the thinning processing is performed are derived from such data, with the result that more accurate thinning processing can be expected.

As described above, according to the present invention, when the resolution is set at the high resolution, the thickening of characters and lines is reduced, and thus high character reproducibility equivalent to that at the standard resolution can be realized.

What is claimed is:
1. An image forming apparatus comprising:
an image carrying member;
a charging device that uniformly charges a surface of the image carrying member;
an exposure device that applies light to the charged image carrying member to form an electrostatic latent image;
a development device that applies a development bias voltage to a developer carrying member which carries a developer including at least a toner and that moves the toner from the developer carrying member to the electrostatic latent image to form a visible image;
a control portion that controls an exposure amount in the exposure device and the development bias voltage; and
a storage portion that stores an exposure condition and a development condition,
wherein a resolution of image data can be switched to at least two types, a standard resolution and a high resolution higher than the standard resolution, and
when the resolution of the image data is set at the high resolution, the control portion controls the exposure amount in the exposure device to perform thinning processing on the image.

2. The image forming apparatus according to claim 1,
wherein the storage portion previously stores an adjustment exposure amount that needs to be lowered from the exposure amount at the standard resolution when the resolution is set at the high resolution to obtain a predetermined thickness of a thin line, and
when the resolution of the image data is set at the high resolution, the control portion lowers the exposure amount in the exposure device only by the adjustment exposure amount as compared with the exposure amount at the standard resolution.

3. The image forming apparatus according to claim 2,
wherein the storage portion previously stores at least one of a relationship between a use environment and a lowest exposure amount and a relationship between the use environment and the adjustment exposure amount,
the control portion includes an environment detection unit that detects an environmental condition used and
when the resolution of the image data is set at the high resolution, the control portion sets at least one of the lowest exposure amount and the adjustment exposure amount at an exposure amount corresponding to a result of the detection of the environment detection unit.

4. The image forming apparatus according to claim 1,
wherein the storage portion previously stores an adjustment exposure amount which needs to be lowered from the exposure amount at the standard resolution when the resolution is set at the high resolution to obtain a predetermined thickness of a thin line and a lowest exposure amount at which a surface potential of the image carrying member can be minimized, and
when the adjustment exposure amount is higher than a difference between the exposure amount at the standard resolution and the lowest exposure amount, the control portion sets the exposure amount in the exposure device at the lowest exposure amount when the resolution of the image data is set at the high resolution.

5. The image forming apparatus according to claim 4,
wherein the storage portion previously stores at least one of a relationship between a use environment and the lowest exposure amount and a relationship between the use environment and the adjustment exposure amount,
the control portion includes an environment detection unit that detects an environmental condition used and
when the resolution of the image data is set at the high resolution, the control portion sets at least one of the lowest exposure amount and the adjustment exposure amount at an exposure amount corresponding to a result of the detection of the environment detection unit.

6. The image forming apparatus according to claim 1,
wherein the storage portion previously stores an adjustment exposure amount which needs to be lowered from the exposure amount at the standard resolution when the resolution is set at the high resolution to obtain a predetermined thickness of a thin line and a lowest exposure amount at which a surface potential of the image carrying member can be minimized,
the control portion includes a test pattern formation unit that forms a predetermined image under a predetermined image formation condition, an image detection unit that optically detects the image formed by the test pattern formation unit and an image analysis unit that analyzes a result of the detection of the detection unit and
when the adjustment exposure amount is lower than a difference between the exposure amount at the standard resolution and the lowest exposure amount, the control portion forms, when the resolution of the image data is set at the high resolution, a plurality of images by changing the exposure amount with the test pattern formation unit, analyzes line widths of the images with image analysis unit to calculate an exposure amount at which the predetermined thickness of the thin line can be obtained and sets the exposure amount at the high resolution at the calculated exposure amount.

7. The image forming apparatus according to claim 6,
wherein the storage portion previously stores at least one of a relationship between a use environment and the lowest exposure amount and a relationship between the use environment and the adjustment exposure amount,
the control portion includes an environment detection unit that detects an environmental condition used and
when the resolution of the image data is set at the high resolution, the control portion sets at least one of the lowest exposure amount and the adjustment exposure amount at an exposure amount corresponding to a result of the detection of the environment detection unit.

8. The image forming apparatus according to claim 1,
wherein the control portion performs, in addition to the thinning processing on the image with the exposure amount in the exposure device, the thinning processing on the image by controlling the development bias voltage.

9. The image forming apparatus according to claim 8,
wherein the storage portion previously stores an adjustment exposure amount which needs to be lowered from the exposure amount at the standard resolution when the resolution is set at the high resolution to obtain a predetermined thickness of a thin line and a lowest exposure amount at which a surface potential of the image carrying member can be minimized,
the control portion includes a test pattern formation unit that forms a predetermined image under a predetermined image formation condition, an image detection unit that optically detects the image formed by the test pattern formation unit and an image analysis unit that analyzes a result of the detection of the detection unit and
when the adjustment exposure amount is higher than a difference between the exposure amount at the standard resolution and the lowest exposure amount, the control portion forms, when the resolution of the image data is set at the high resolution, a plurality of images by changing the development bias voltage with the test pattern formation unit, analyzes densities of the images with the image analysis unit to calculate a development bias voltage at which a predetermined image density can be obtained, forms a plurality of images by changing the exposure amount with the test pattern formation unit under a condition of the calculated bias voltage, calculates, from the images, with the image analysis unit, an exposure amount at which the predetermined thickness of the thin line can be obtained, sets the development bias voltage at the high resolution at the calculated bias voltage and sets the exposure amount at the calculated exposure amount.

10. The image forming apparatus according to claim 8,
wherein the storage portion previously stores at least one of a relationship between a use environment and a lowest exposure amount and a relationship between the use environment and an adjustment exposure amount,
the control portion includes an environment detection unit that detects an environmental condition used and when the resolution of the image data is set at the high resolution, the control portion sets at least one of the lowest exposure amount and the adjustment exposure amount at an exposure amount corresponding to a result of the detection of the environment detection unit.

* * * * *